(No Model.)  6 Sheets—Sheet 1.
W. C. WOOD.
ART OF DRY SAND MOLDING.
No. 525,040.  Patented Aug. 28, 1894.
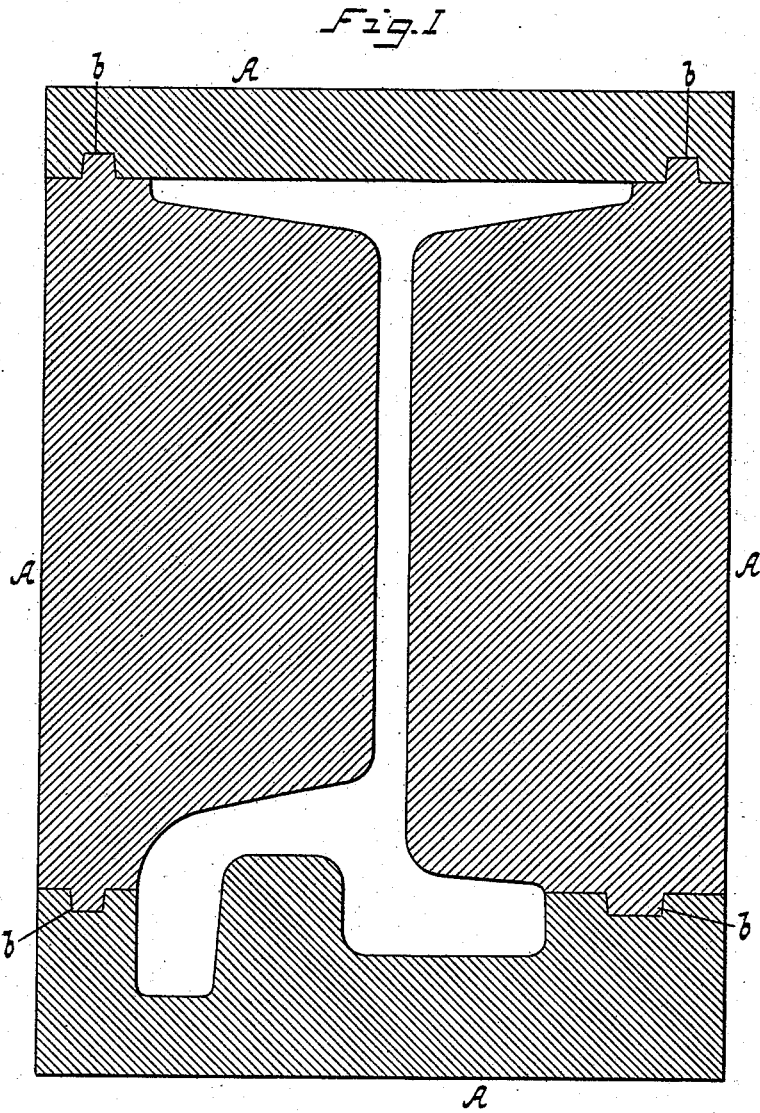
Fig. I
WITNESSES:
Chas. Wahlers
H. W. Hoover.
INVENTOR
William C. Wood
BY
Charles G. Coe
ATTORNEY.

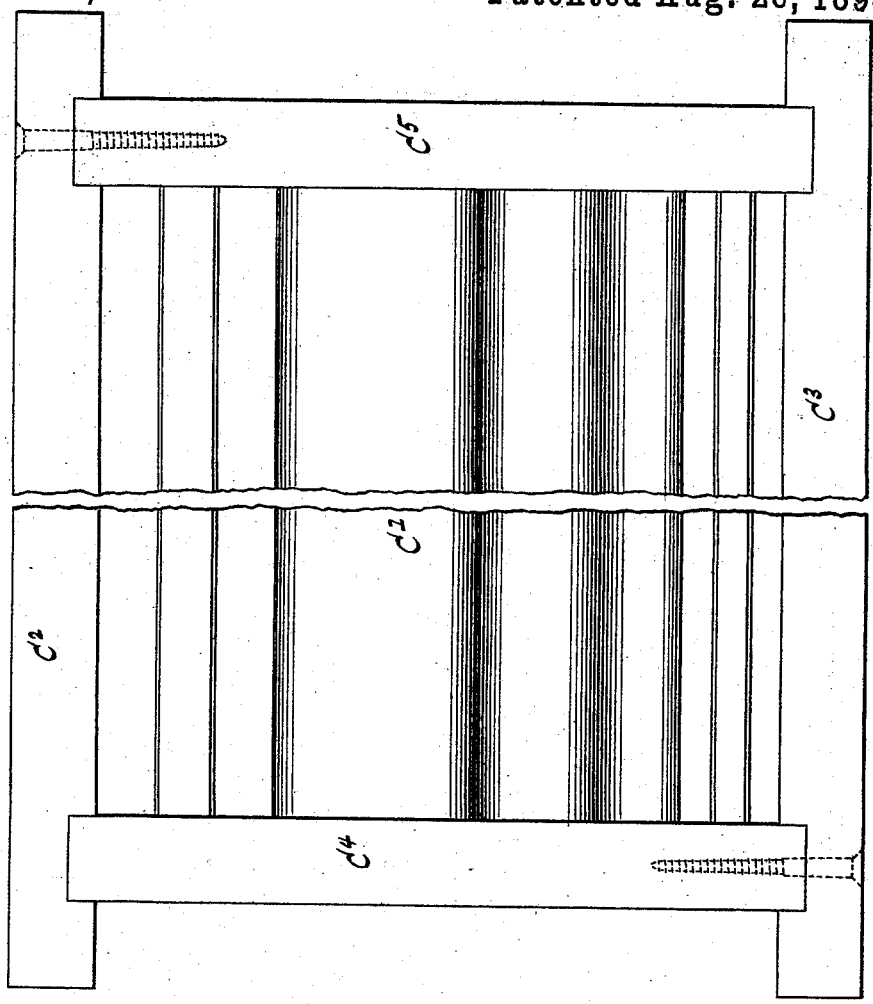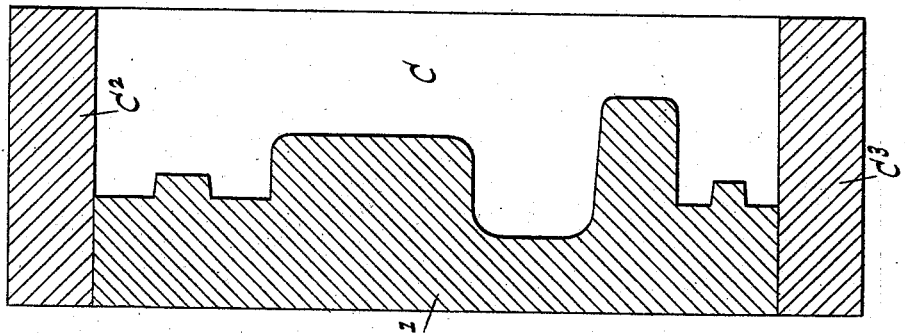

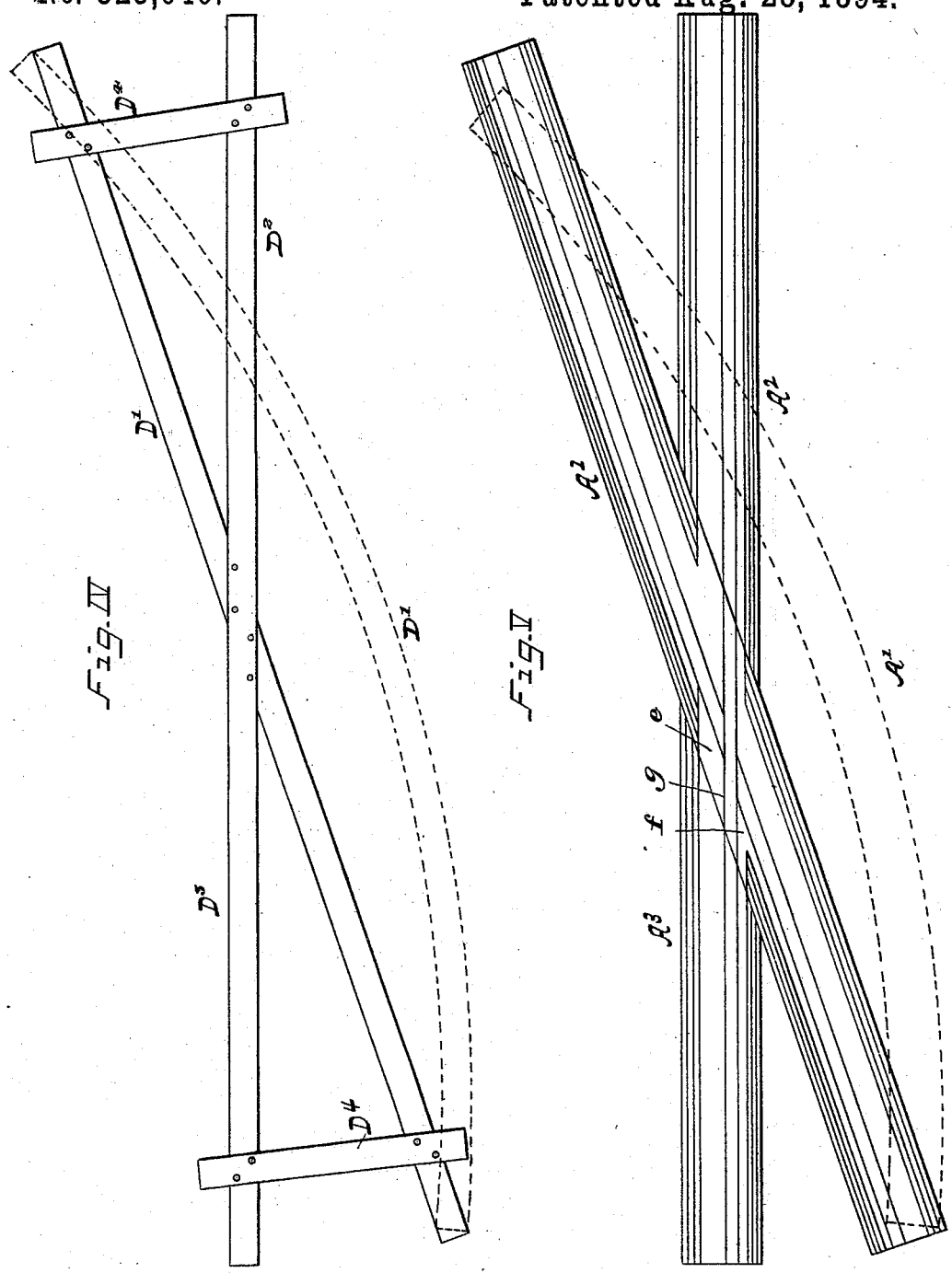

(No Model.) 6 Sheets—Sheet 4.
W. C. WOOD.
ART OF DRY SAND MOLDING.
No. 525,040. Patented Aug. 28, 1894.
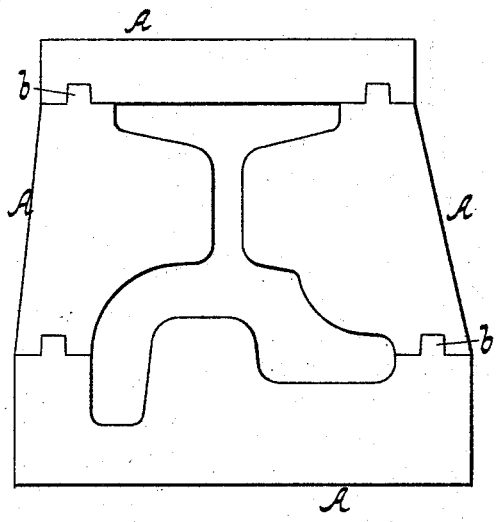
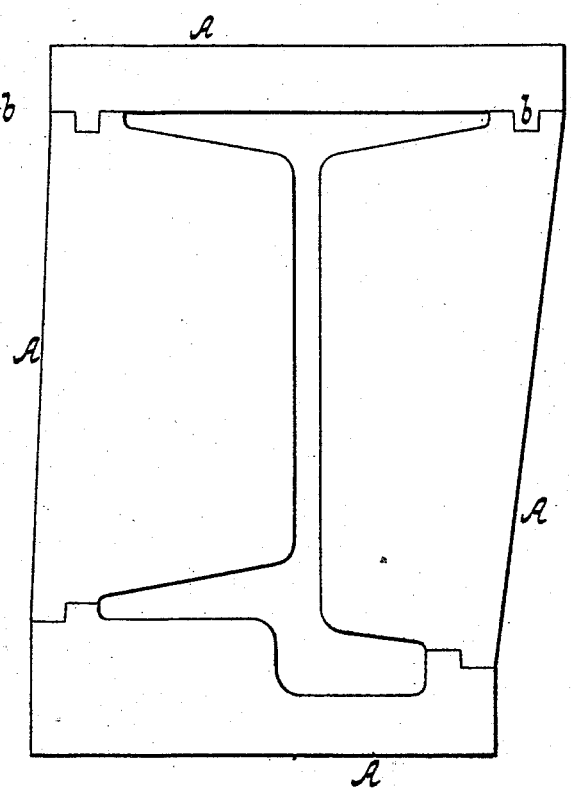
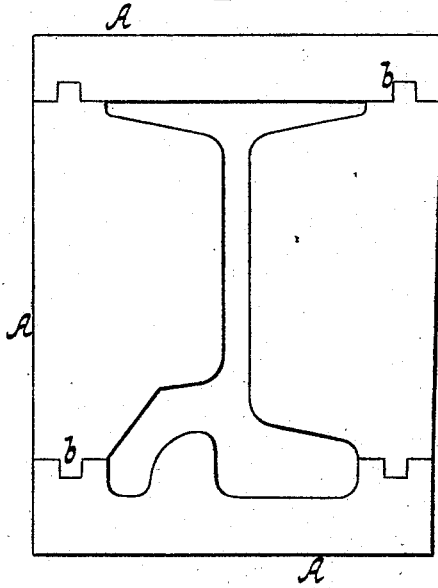
WITNESSES:
INVENTOR
William C. Wood
BY
Charles G. Poe
ATTORNEY.

(No Model.)  6 Sheets—Sheet 5.
W. C. WOOD.
ART OF DRY SAND MOLDING.
No. 525,040. Patented Aug. 28, 1894.
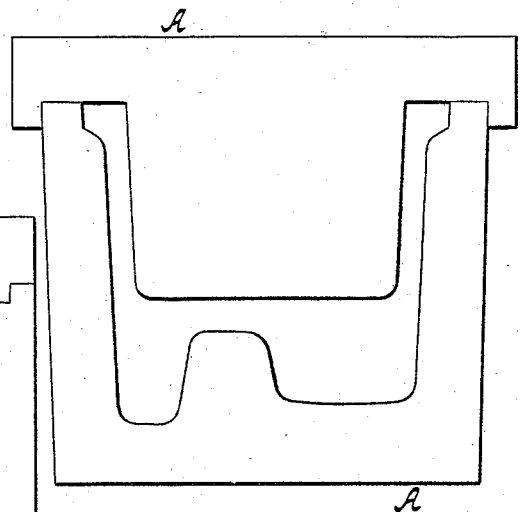
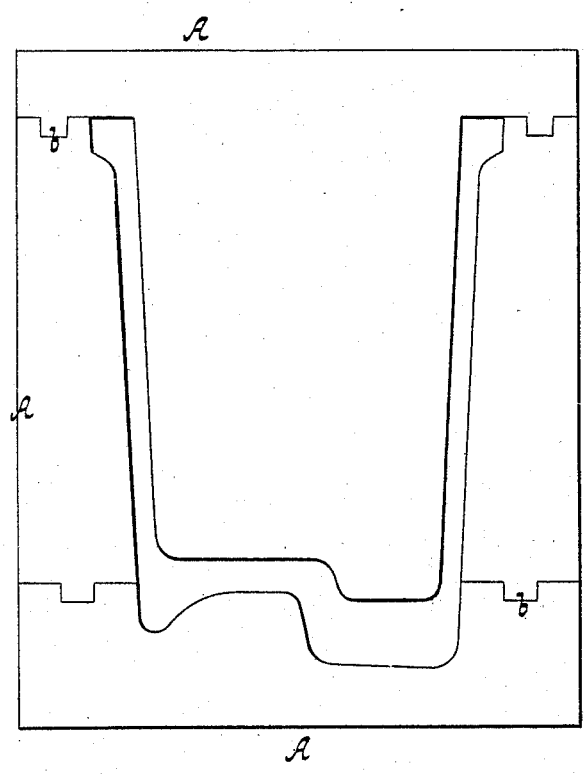
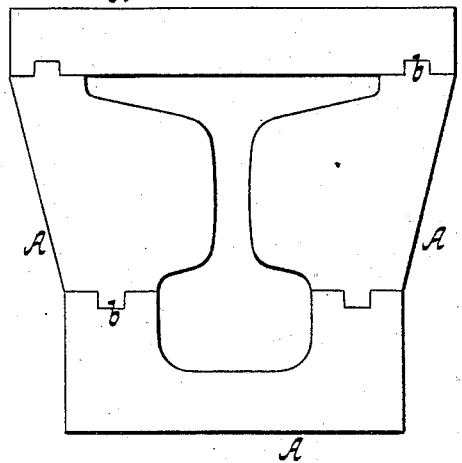
WITNESSES:
Chas. Wahlers
H. W. Hoover
INVENTOR
William C. Wood
BY
Charles E. Poe
ATTORNEY.

(No Model.)
W. C. WOOD.
ART OF DRY SAND MOLDING.
No. 525,040.                    Patented Aug. 28, 1894.
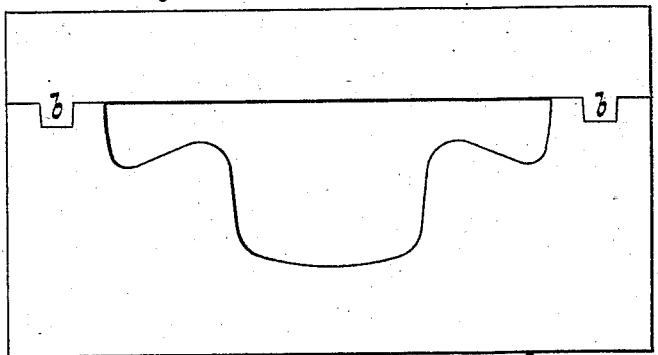
Fig. XII
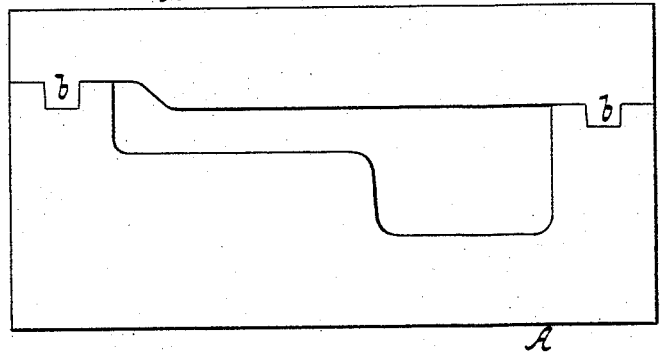
Fig. XIII
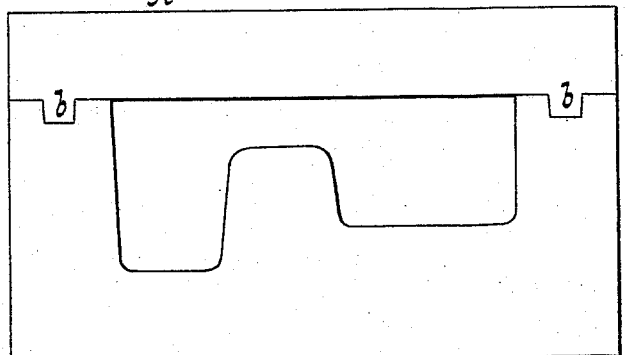
Fig. XIV
WITNESSES:
Chas. Wahlers
H. W. Hoover
INVENTOR
William C. Wood
BY
Charles G. Coe
ATTORNEY.

UNITED STATES PATENT OFFICE.

WILLIAM CLARK WOOD, OF BROOKLYN, NEW YORK.

ART OF DRY-SAND MOLDING.

SPECIFICATION forming part of Letters Patent No. 525,040, dated August 28, 1894.

Application filed February 9, 1894. Serial No. 499,598. (No specimens.)

*To all whom it may concern:*

Be it known that I, WILLIAM CLARK WOOD, a citizen of the United States of America, and a resident of Brooklyn, Kings county, in the State of New York, have invented a new and useful Improvement in the Art of Dry-Sand Molding, of which the following is a specification.

This invention relates primarily to the production of railroad frogs and crossings as one-part steel castings, without patterns or flasks, but is applicable in part to the economical production of other castings of steel or iron, for railroad tracks or for other purposes, where the article to be produced, is composed of intersecting members or portions, each of uniform cross-section throughout its length, as in a railroad frog or crossing.

Heretofore dry sand molds, apart from their cores, have been made, in common with green-sand molds, from the loose sand, with the aid of expensive patterns corresponding in principal proportions and cross-sections if not in all dimensions with the article to be produced, and by means of heavy and expensive flasks with cross-bars for the cope at least, to provide for handling the latter or the respective parts of the mold. In so molding railroad frogs and crossings of cast-steel, the necessity for thoroughly baking each mold in the flask-parts to eliminate moisture before the mold is used to receive the molten steel has involved expensive "stoves" of great size to contain the large flasks, and has rendered the process slow and unsatisfactory because of the time required to bake the molds and the space required to store the large patterns and flasks, most of them confined to the production of a single frog or crossing of one pattern as regards the cross-section or cross-sections of the respective rails, the angle of intersection, and the curve-radius in the case of curve-crossings or frogs. The terms "dry-sand mold" and "dry-sand molding" are used herein to signify baked or dried molded molds and the art of producing them whether their material be suitably treated molders' sand or clay or loam.

The present invention consists in certain improvements in molding cast-steel railroad frogs and like castings, and in the art of dry-sand molding more generally considered, as hereinafter set forth and claimed; the molds being adapted to be poured even with "cast-steel" as soon as they are constructed, all the walls of the matrical cavity being formed by previously baked mold-parts, and to produce railroad frogs and crossings preserving the cross-section of the rails of the track, whatever that may be, so as to be connected with each other and with the adjoining rails in the same manner and by the same means as those employed at the rail-joints of the road, and supported upon cross-ties or stringers, with or without chairs, like the remainder of the track, and with the whole frog or crossing a single casting if desired; and this without employing any patterns, and without the aid of flasks; the substitutes for patterns being in the form of light and simple wooden boxes in which to mold the respective mold-parts, and only a few such boxes being required for a great variety of frogs and crossings made to correspond with a given pattern of rail.

Six sheets of drawings accompany this specification as part thereof.

Figure I of these drawings represents a cross-section through four interlocked mold-parts, as hereinafter described. Figs. II and III represent respectively a cross-section and a plan view of a typical sand-molding box for shaping one of said mold-parts. Fig. IV is a plan view of a templet for laying out the mold of a given railroad frog. Fig. V is a plan view of the bottom-parts of a frog-mold laid out by means of said templet; and Figs. VI to XIV inclusive represent end views of sets of mold-parts, for railroad frogs or the like, matching in cross-section different standard patterns of rails.

Like letters of reference indicate corresponding parts in all the figures.

To produce a dry-sand mold, Fig. V, for a given railroad frog, for example, according to the present invention, I produce, if not already in stock, one or more sets of mold-parts A, Fig. I, which jointly form a matrical recess corresponding in cross-section with the pattern of rail to be connected by the frog. Longitudinal tongue-and-groove joints *b* insure the correct position of each part relatively to the others, and serve to resist the lateral displacement of the side parts by the molten metal in the finished mold. Each of said mold-parts A is shaped by means of a sand-molding box, Figs. II and III, of suitable wood, having a matrical cavity C, Fig. II, which corresponds in cross-section with the cross-section of its product, and may conveniently be of any required length. Each box is composed of a bottom-board C', side-boards C² C³, and end-boards C⁴ C⁵, united by screws so as to be readily loosened.

The particular box represented by Figs. II and III is adapted to produce the bottom-part of the set of mold-parts represented by Fig. I, which in turn is adapted to produce the top of a grooved girder-rail having a high guard for use on curves. To produce said bottom-part the bottom C' only of the sand-molding box requires special shaping; the sides C² C³ as well as the ends C⁴ C⁵ being cut from flat boards. The same is true of the box for shaping the top mold-part A in all cases illustrated by the accompanying drawings. For shaping the respective side mold-parts shown in Fig. I the sides as well as the bottom of the sand-molding box are required to be shaped by a templet or gage. As soon as a mold-part is shaped in the sand-molding box it is loosened by separating the parts of the box to a sufficient extent, and is turned out upon a plate, upon which it is carried to the "stove" where it is baked until it is thoroughly dry and hard, and is then ready for use in the construction of any mold for which it may be appropriate.

The particular frog-mold represented by Fig. V is composed of mold-parts of the pattern represented by Fig. I, and comprises a section A' for the through run of the frog, and two sections A² A³ corresponding respectively with the ends of a second run crossed by such through run. When one of the runs is curved this is preferably formed by the through section of the mold, as the mold-parts for the curved run would require the same specific curve-radius and could most economically be formed of the required length for the entire frog, while the straight mold-parts can be more readily mitered and otherwise cut and fitted. Consequently, for casting a frog for an intersection of straight and curved tracks, the mold-section A' would be curved and the sections A² and A³ straight. A curved mold-section is represented by dotted lines in Fig. V.

In laying out and constructing the mold upon the foundry floor, by means of the templet, Fig. IV, I proceed as follows: The proper bottom-part for the mold-section A' having been cut if necessary to the required length and laid upon the floor, the bar D' of the templet is laid on it, and suitable lengths of the appropriate bottom-part are sawed off at the proper angle to form the bottoms of the sections A² and A³, according to the templet-bar D² D³. Curving said bar D' to fit a given curved mold section A' is represented by dotted lines in Fig. IV. (The cross-bars D⁴ of the templet serve simply as stays and handles.) The templet is then removed, and the matrical cavities of the respective mold-sections are connected with each other by cutting through the upper flanges of said bottom-part of the section A' those depressions of the sections A² and A³ which form the tread and the high guard of that run of the frog which is cast in said sections A² and A³, as represented at e and f in Fig. V, and by extending across said section A' the ridges of said sections A² and A³ which form the groove in that run of the frog, as represented at g in Fig. V. Such alterations at e and f involve simply cutting operations readily effected by means of a hand-saw and a file. The ridge extension at g is effected by cutting a groove across the section A' in line with the ridges of sections A² and A³ and inserting in said groove a piece of the baked mold-material cut in like manner to the required shape and proportions and inserted into such groove. After the bottom mold-parts are completed and reassembled, the side mold-parts of the through section A' may next be put in position followed by those of the sections A² and A³, and these parts may be mitered together in the same manner as said bottom-parts. In this case the matrical recesses of said sections A² and A³ are cut through the side mold-parts of the section A', which is readily effected by means of a handsaw and file. The top mold-parts of the respective sections are then applied mitered together and their matrical recesses connected in like manner, and are provided with the gate and risers of the mold. The several mold-ends are then closed by means of stoppers of baked sand or other suitable material; the mold is secured against the separation of the mold-parts as by covering the mold with loose sand to a sufficient depth; and the molten metal is then poured. Frogs or crossings for other intersections of tracks laid with the same pattern of rail are molded in the same or substantially the same manner; the straight mold-parts serving in common for all straight mold-sections and the curved mold-parts for all curved mold-sections of like radii. Molds for frogs, crossings or other track-castings which can be so molded may be made with mold-parts as represented by Figs. VI to XIV inclusive, in like manner, by those skilled in the art, without further description. In forming molds from the mold-parts represented by said Figs. IX and XI the side-parts of each, being alike, may be shaped in one and the same sand-molding box. In a mold made from either set of the mold-parts represented in Figs. X, XII, XIII and XIV there are but two mold-parts in each mold-section.

Railroad track-castings are in all cases made tread-downward, so as to insure a sufficient compression of the metal which forms the parts exposed to the greatest wear.

Where both members of a frog or all the members of a crossing or the like are straight, four sand-molding boxes at most are all that need be kept in stock to provide for its reproduction, or for the production of straight sections for molding other frogs or crossings of the same rail pattern, and the mold-parts themselves can be kept in a dry place for a long period without becoming impaired by age, and are sufficiently strong to be readily handled without breaking, while they can be cut by sawing to any required extent. Frogs, crossings, or the like, can thus be produced with great economy of time and labor and at a comparatively low cost, as compared with casting them in molds the construction of each of which demands a pattern appropriate to that mold, as a whole, and a suitable flask of sufficient dimensions to inclose such mold.

The use of snap-flasks as heretofore commonly practiced in making certain castings does not answer the same purpose as the construction and process of molding above described, because such use does not obviate the construction of each mold from loose sand, and the employment of a pattern corresponding more or less fully with the article as a whole to be produced; and it does not meet the difficulty experienced in constructing large dry-sand molds for railroad frogs and crossings of cast-steel. Loam-molding dispenses with patterns and flasks, but does not dispense with the construction of each mold and practically every part of each mold afresh. Moreover it is not applicable to the production of track-castings.

I have represented only railroad steel or iron in the drawings, but it will be apparent that the invention is equally applicable to the molding and casting of girder-intersections for architectural structures and for use in bridge-building and ship-building, and to the production of other like castings.

Having thus described the said improvement, I claim as my invention and desire to patent under this specification—

1. The improvement in the art of dry-sand molding hereinbefore specified which consists in forming a mold for a cast-steel railroad frog or the like, without pattern or flask, by preliminarily shaping and baking separate from each other all those parts of the mold which form its matrical cavity, and mitering together the baked mold-parts and completing the matrical cavity at each intersection by cutting operations.

2. The method of molding railroad frogs and like track-castings which consists in preliminarily shaping and baking separate from each other mold-parts capable of use in common to form mold-sections of a given rail pattern, and mitering together the dry-sand mold-parts so produced and completing the connection of their matrical recesses by cutting operations, substantially as hereinbefore specified.

3. The process of molding a railroad-frog or the like without pattern or flask which consists in preliminarily shaping all those parts of the mold which form the walls of the matrical cavity in separate and distinct sand-molding boxes, each appropriate to mold-parts in common of a given shape and dimensions in cross-section, baking the mold-parts so preliminarily shaped, and mitering together the baked mold-parts and connecting with each other the matrical cavities of the respective mold-sections by cutting operations, substantially as hereinbefore specified.

4. The method of forming dry-sand molds without patterns or flasks which consists in preliminarily shaping and baking separate mold-parts each of uniform cross-section from end to end, assembling and cutting such parts to form the mold excepting its ends, and closing the ends of the mold with stoppers of suitable material, substantially as hereinbefore specified.

5. The method of molding a railroad frog or crossing which consists in constructing the mold in three longitudinally divided sections each composed of dry sand mold-parts which jointly form the matrical cavity of the mold, and bringing said mold-sections to the required angle in relation to each other by means of a templet, substantially as hereinbefore specified.

WILLIAM CLARK WOOD.

Witnesses:
CHARLES G. COE,
CHAS. WAHLERS.